Nov. 23, 1965     J. GOEDKOOP     3,218,986
MATERIALS HANDLING SYSTEMS
Filed June 14, 1963     4 Sheets-Sheet 1
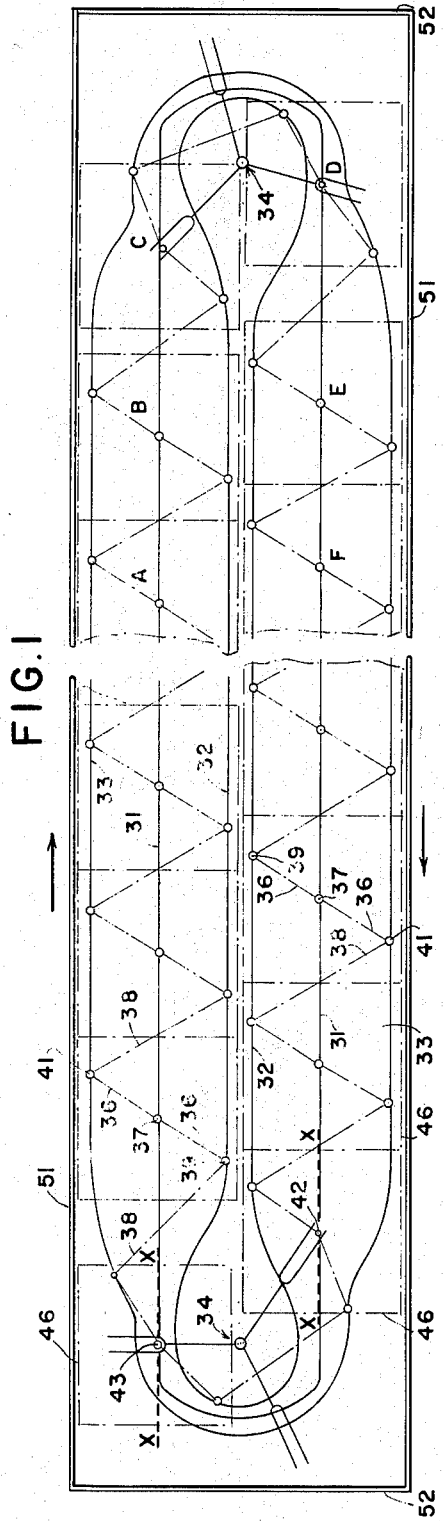
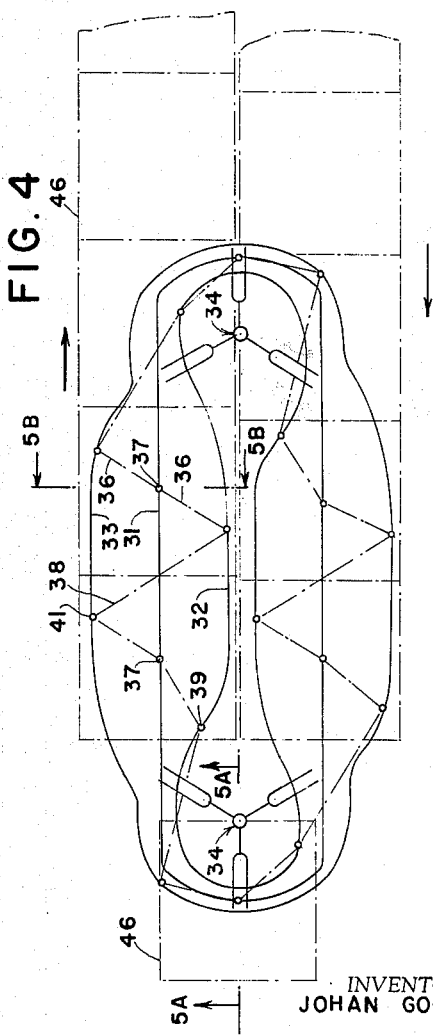
INVENTOR.
JOHAN GOEDKOOP
BY
ATTORNEY

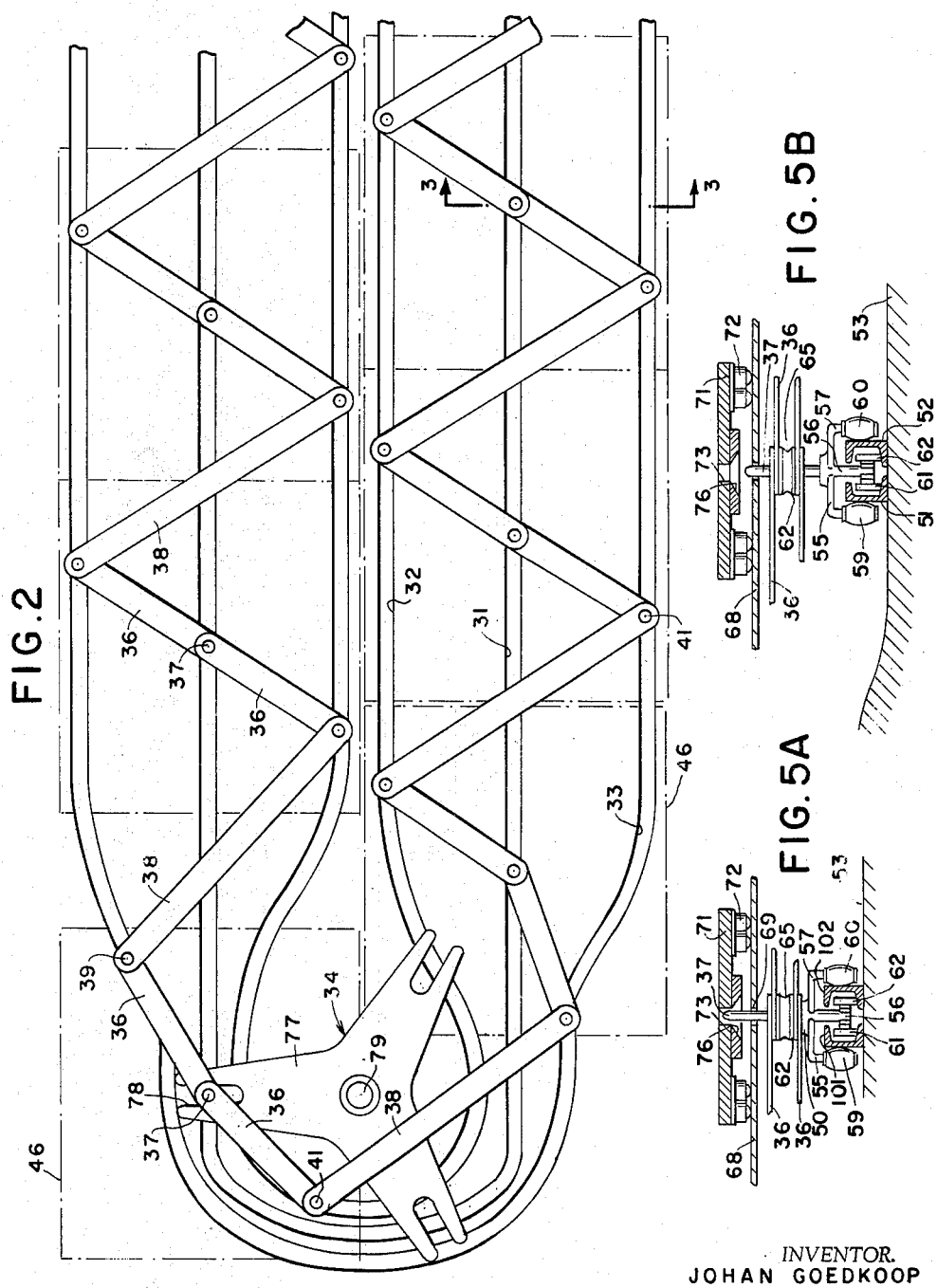

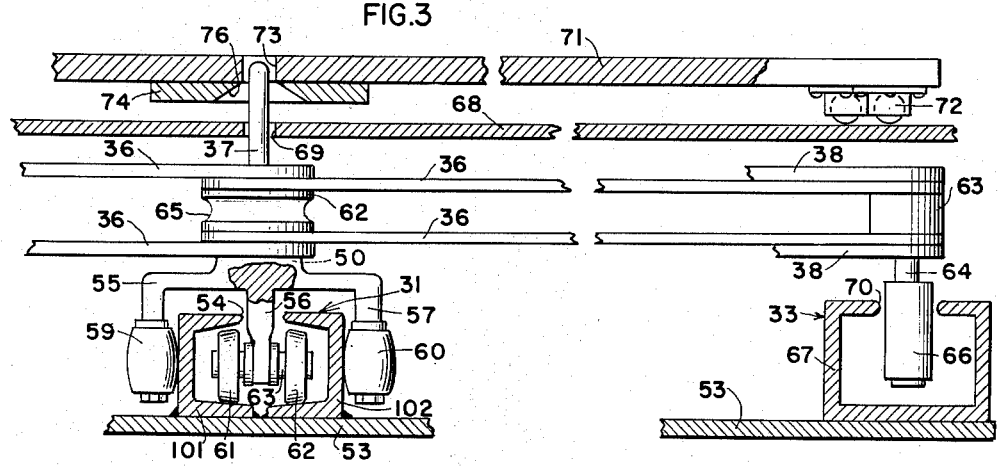

Nov. 23, 1965     J. GOEDKOOP     3,218,986
MATERIALS HANDLING SYSTEMS
Filed June 14, 1963     4 Sheets-Sheet 4
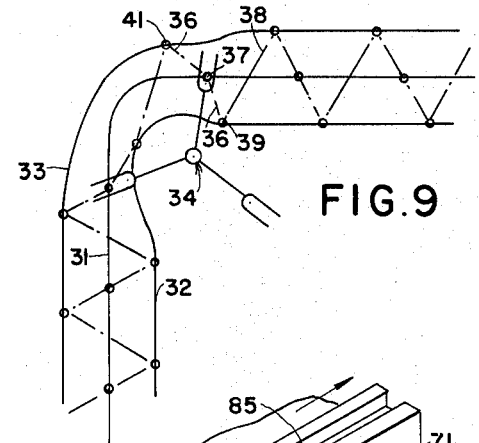
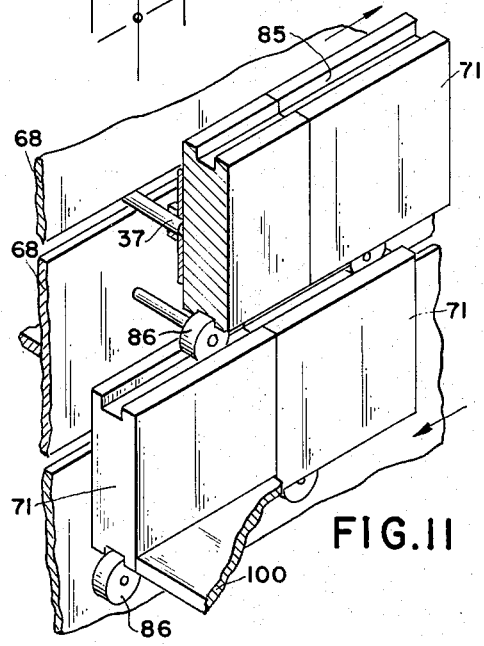
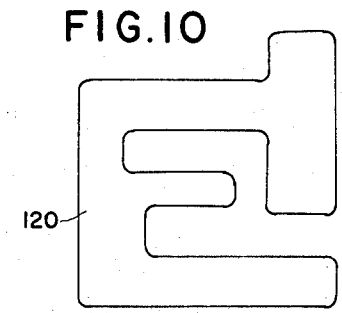
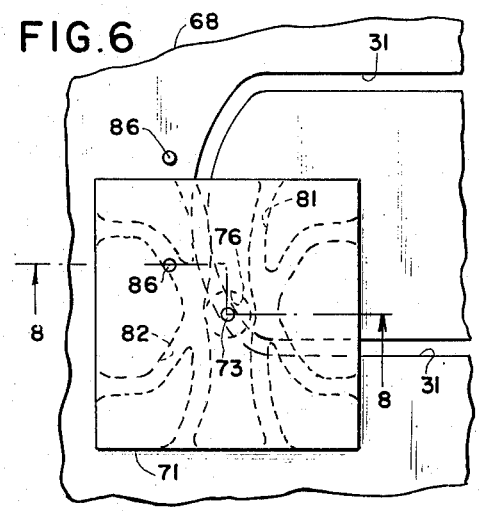
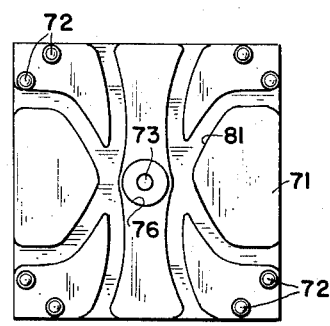
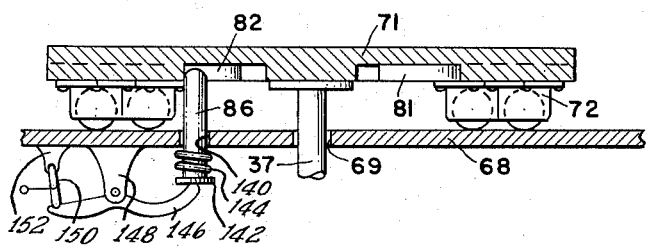
INVENTOR.
JOHAN GOEDKOOP
BY Harry Cole
ATTORNEY United States Patent Office 3,218,986
Patented Nov. 23, 1965

3,218,986
MATERIALS HANDLING SYSTEMS
Johan Goedkoop, Sloatsburg, N.Y. (% Netherlands Industrial Trading Corp., 17 Battery Place, New York, N.Y.)
Filed June 14, 1963, Ser. No. 288,016
30 Claims. (Cl. 104—25)

This invention relates to materials handling systems, and has for a principal object the provision of apparatus for the storage and conveyance of articles which enable substantially maximum utilization of available storage space.

A further object of the invention is the provision of apparatus as above which provide for the fully automatic handling of the stored articles whereby ready and convenient access may be had to any desired article stored within the system.

Another object of the invention, in another aspect thereof, is the provision of apparatus as above which make possible the simultaneous movements of articles in both the vertical and horizontal planes to provide maximum article handling flexibility and attendant conveyor storage system adaptability.

Another object of the invention is the provision of a conveyor-storage system embodying significant economies in the design and construction thereof, and requiring a minimum amount of attention, and attendant expense, in the operation thereof.

Another object is the provision of a conveyor-storage system which is of such character that it is not necessary to enter the storage space in order to operate the system. This is highly desirable, especially when fire occurs in the storage space.

Another object of the invention is the provision of a conveyor-storage system of such flexibility as to make possible an almost limitless number of different system configurations in accordance with the general outlines of space available for the installation thereof.

The above and other objects and advantages of the invention are believed made clear by detailed reference hereinbelow to the accompanying drawings wherein:

FIG. 1 is a schematic plan view of a first embodiment of the invention;

FIG. 2 is a top plan view of the embodiment of FIG. 1;

FIG. 3 is a cross sectional view taken along line 3—3 of FIG. 2;

FIG. 4 is a schematic view of a second embodiment of the invention;

FIG. 5A is a cross sectional view as seen along line 5A—5A of FIG. 4;

FIG. 5B is a cross sectional view as seen along line 5B—5B of FIG. 4;

FIG. 6 is a top plan view of a modified form of pallet for use with the invention;

FIG. 7 is a bottom view of the pallet of FIG. 6;

FIG. 8 is a cross sectional view taken along line 8—8 in FIG. 6;

FIG. 9 is a schematic view of another embodiment of the invention;

FIG. 10 is a schematic view of a conveyor-storage system configuration made possible by the apparatus of the invention;

FIG. 11 is a perspective view of another embodiment of the invention; and

FIG. 12 is a perspective view of another embodiment of the invention.

In a preferred embodiment herein disclosed, the invention will be seen to comprise guide means of generally closed loop configuration. Article support and moving means, including a plurality of links pivotally interconnected in endless chain fashion, are positioned for relative driven movement along the guide means whereby articles may be supported and moved thereby to or from any point on the guide means. Provision is made whereby the article support and moving means, and the articles supported thereby, may follow sharp curves or other abrupt changes in the configuration of the guide means with minimum additional space requirements to thereby enable substantially maximum utilization of available storage space.

The basic mechanisms of the invention are schematically depicted in FIG. 1 and will first be generally described before proceeding to the more detailed description thereof in conjunction with FIGS. 2 and 3. In a preferred embodiment, the invention comprises a closed loop drive track 31 with closed loop inner and outer guide tracks 32 and 33, respectively, of different configurations positioned on opposite side thereof in the depicted manner. A system of links, pivotally interconnected in endless chain fashion is positioned for driven movement around the guide tracks by driving elements 34 rotatably mounted adjacent opposite end portions of the closed loop configuration of the inner guide track 32. The link system comprises driven links 36, pivotally interconnected at adjacent opposite extremities thereof to drive pins 37, and connecting links 38, pivotally interconnected to the other extremities of the driven links at guide pins 39 and 41, respectively. Means are included on the drive and guide pins for cooperation with the guide and drive tracks to insure that the pins are always in alignment with the related tracks as the link system is driven around the tracks. The drive pins 37 cooperate with the driving means 34 as seen, for example, at 42 and 43, to enable the drive of the link system around the tracks. Article support means 46 are depicted by the dash lines in the subject figure, and are each removably attached at the central portions thereof to the drive pins 37, whereby the support means will be driven by and follow exactly the movement of these drive pins as the latter are in turn driven around the closed loop path of the drive track by the drive means 34. The said article support means need of course be only of the minimum size required to support articles thereon, and this size may vary in accordance with variations in the nature and size of articles to be stored and conveyed by the system of the invention.

It is a primary purpose of this invention to drive the drive pins 37 around the said track, while effecting relative movement between adjacent pins where necessary, in such manner that the article support means 46 driven in turn thereby will require no space therebetween when moving along substantially the entire extent of the straight line portions of the drive track 31, and a minimum of space therebetween when moving along the curved end portions of the said track. This latter condition is made possible by maintaining the axis X—X of each article support means parallel to the corresponding X—X axis of every other support means as the first mentioned means is driven by the drive means 34 around the curved end portions of the drive track 31. Thus, it may be seen wherein the invention makes possible a complete reversal in the direction of travel of a support means within an area no wider than the combined widths of two such means, whereby the entire area required for a conveyor-storage system which provides for the storage of articles and movement thereof completely around a closed path is reduced to a generally rectangular configuration of absolutely minimum width, i.e. the width of two articles positioned side by side with a slight clearance therebetween, and of length which is less than two article lengths greater than the combined lengths of one half the articles to be stored and conveyed thereby. Elements 51 and 52 are guide walls, and especially important are the portions thereof adjacent the curved end portions of the drive tracks whereby any tendency of the article support means 46 to deviate from the above mentioned parallel axis orientation will be substantially inhibited. The guide walls, of course, define the boundaries of the space required for operation of the closed conveyor storage system of the invention whereby it may be appreciated that the only extra space required is that necessitated by the minimum additional length required to enable the article support means to turn the corners and reverse direction in the above-described space saving manner.

Relative movement between adjacent drive pins 37 is not desirable, as mentioned hereinabove, during substantially all of the travel thereof along the straight portions of the drive track 31, in that here the spacing between the said pins should be maintained constant and equal to the length of an article support means 46 to utilize all available space. Such relative movement between the said pins does, however, become essential when the said pins traverse the curved portions of the said drive tracks in order that the article support means driven thereby may traverse the end portions in the desired manner with minimum additional space required therebetween. This relative movement between adjacent drive pins is provided by the relationship between the configurations of the curved portions of the guide and drive tracks, and the pivotally interconnected link system. For purposes of illustration, the relative spacing between adjacent drive pins 37 as the pins in turn approach, traverse and leave the curved end portion of the drive track 36 will be analyzed with the letters A through F utilized in the subject figure for convenience of reference.

At the outset it may be noted that, generally, the velocity of the drive pin along the drive track will increase in those areas wherein theguide tracks converge toward the drive track; decrease in those areas where the guide tracks diverge from the drive track; and remain substantially constant in those areas wherein all three tracks are straight. As two adjacent drive pins approach the curved end portion of the drive track on the straight portion thereof, the distance B–A therebetween will, of course, be equal to the length of an article support means 46. However, shortly after the leading pin enters the straight portion of the drive track located between the end portions of the inner and outer guide tracks, the velocity of the leading pin will increase relative to the velocity of the trailing pin due to the effect of the said guide track portions upon the link system whereby the said pin will be accelerated to increase the distance between adjacent pins to the distance C–B. The leading pin is thence driven around the curved portion of the drive track 31 by the driving means 34 to point D to further increase the distance between the pins, as taken along the drive track, to equal the distance D–C. At that point, the leading pin has completely traversed the curved portion of the drive track, re-entered the straight portion thereof, and it is just approaching release from the drive means 34. The trailing pin is, however, now in engagement with the drive means for driving it around the said curved track portion. Thus, the lead pin will travel to E, while the velocity thereof decreases at substantially the same rate at which it increased when the pin initially approached point C. This decrease in the velocity of lead pin is due to the effect of the now once-again straight configurations of the drive and guide tracks on the link system. Thus, the distance between the pins, again as taken along the drive track, will be decreased to distance E–D. The last step in the traversal of the curve follows whereby the trailing pin completes the traverse of the curved end portion of the drive track and is in turn moved to point E. Thus, the distance F–E between pins once again equals the length of an article support means 46.

Turning now to the more detailed depiction in FIGS. 2 and 3 of the basic mechanisms of the invention depicted in FIG. 1, the drive track 31 will be seen in cross section to comprise opposed channel shaped members 101 and 102 mounted on support base member 53 in spaced relationship to form slot 54 located therebetween. The lower extremity of the drive pin 37 comprises forked end portions 55, 56 and 57, respectively; with guide rollers 59 and 60 rotatably journaled on end portions 55 and 57, and guide rollers 61 and 62 rotatably journaled on shaft 63 which is attached as shown to drive pin end portion 56. Thus, it may be appreciated wherein the drive pin end portion 56 will be constrained to ride within and follow the configuration of the slot 54. The drive links 36, preferably but not necessarily of the depicted double link construction for additional rigidity, are pivotally mounted on the drive pin 37 as shown with driving collar 62 positioned therebetween. Link system support collar 50 is formed as shown on the drive pin to provide a bearing surface for the support of the link system against the force of gravity. The drive links 36 comprise a connecting lever attachment element 63 secured at opposite ends thereof whereby connecting links 38 may be pivotally attached to the drive links in the depicted manner. Guide shaft 64, including enlarged end 66, is secured to and extends downwardly from the attachment member. Box-shaped member 67 is mounted on the base support member 53 below the enlarged end of the guide shaft and includes a slot 70 into which the said enlarged shaft end projects. The slot 70 thus forms the outer guide track 33 as seen in FIGS. 1 and 2, whereby the movement of the pivotally connected extremities of the drive and connecting links is guided by the restraining effect of the walls of slot 70 upon the enlarged guide shaft end.

Support platform 68 is mounted over the lever and track assembly in any convenient manner and seen to comprise a slot 69 formed therein. This slot is of identical configuration, as seen from the top of the platform, as the slot 54 formed by the opposed channel shaped members 101 and 102. The upper extremity of drive pin 37 extends through this slot for movement therewithin as the lower extremity 56 of the pin is driven through slot 54. The article support means 46 is depicted to FIG. 3 as comprising a pallet 71 which includes multiple roller asemblies 72 attached thereto in each of the four corners thereof (see FIG. 3) whereby the pallet may roll on the support platform. Strengthening member 74 is attached to the underside of the pallet and includes a funnel shaped hole 76 formed therein. Drive pin hole 73 is formed in the pallet in alignment with the funnel shaped hole whereby the pallet may be removably positioned as shown on the support platform and driven by the drive pin around the conveyor storage system. Alternatively, the support platform 68 may be eliminated and provision made for the support of the pallet or similar article support means, or the article itself, directly on the drive pin in any convenient manner. Too, in cases where a support platform is used, the pallet and article may be combined as one specially designed assembly, as for example a roller mounted, generally square shaped, liquid or powder container.

The drive means 34 will be seen in FIG. 2 to comprise three identical arm portions 77 with identical drive slots 78 formed therein. The drive means is fixedly mounted upon shaft 79 and rotatably driven thereby to drive the link system around the tracks by the engagement of the walls of the slots 78 with the concave portions 65 (see FIG. 3) of the drive pin driving collars 62. The drive shaft 79 may be driven in any convenient manner, as for example by an electric motor mounted therebelow. At this juncture it is believed well to note that although two drive means 34 are depicted in FIG. 1, only one need be driven directly with the other driven therefrom in any convenient manner such as by a belt and pulley extending therebetween beneath support platform 68. Alternatively, only one such drive means may be employed since the relationship between the link system and tracks is fixed in the manner made clear by FIG. 3, whereby a single drive means would suffice to drive the entire link system around the tracks. Guide walls 51 and 52 are depicted in FIG. 2 as positioned at the outer boundaries of the conveyor-storage system, and function in the hereinabove described manner to maintain the proper orientation of the pallets 71 as the latter are in turn driven around the curved portions of the drive track.

In the embodiment of FIGS. 4, 5A and 5B, the essential features of the invention are correspondingly numbered and remain the same with the exception that instead of a system of links and guide and drive tracks which extend the entire length of the conveyor-storage system, a separate closed system of guide and drive tracks, links and driving means, is employed at each point where the flow of article support means materially changes direction. Thus, it may be appreciated wherein, in a conveyor-storage system of substantial extent, an overly long endless chain of pivotally interconnected links, and attendant drive and guide tracks, may be avoided. However, since the link and guide and drive track system does not extend throughout the entire conveyor storage system, provision must be made for the engagement and release of the pallets by the drive pins as the former approach, traverse, and leave the curved portions of the system. This may be readily accomplished, for example, as depicted in FIGS. 5A and 5B, by varying the relative positioning of support base member 53 and support platform 68 to support the channel shaped members which form the drive track and determine the level at which drive pins 37 ride relative to the pallet support platform 68. Thus, as a pallet 71 rolls freely along support platform 68 and approaches a curved end portion of the system, the level of the drive track may be raised relative to the level of the platform by inclining base support member 53 toward the platform as seen in FIG. 5A, whereby a moving drive pin will project through the support plate slot 69 into engagement with the holes 76 and 73 in the moving pallet for driving attachment therebetween to drive the pallet around the said curved end portion in the hereinabove described manner. On the other hand, after the pallet has completed its travel around the curved end portion and re-entered the straight portion of the guide track, the base support member may be returned to the lower level thereof relative to the support platform as seen in FIG. 5B, whereby the drive pin will move out of engagement with the pallet and be returned to engage and drive another pallet around the closed end portion of the system in the same manner. Movement of the pallets along the generally straight portions of the system which are not, in this application of the invention, equipped with pallet moving means, is accomplished by the push given a line of pallets located thereon by each pallet as it is in turn driven through a material change in direction by the drive pins and returned, with positive velocity, to the generally straight system portions. Too, the natural rigidity of the link system will function to maintain the entire system at the same level due to the action of the link support collars 50 on a major portion of the system.

FIGS. 6, 7 and 8 depict a construction which may be utilized in any of the herein-disclosed embodiments of the invention in lieu of the walls 51 and 52 for maintaining proper parallel axis orientation of the pallets as they are in turn driven around the closed end portions of the conveyor storage system. Grooves 81 and 82 of the depicted configurations are formed in the underside of each of the pallets. The configuration of these grooves is determined by overlapping partial segments of the configuration of the drive track 31. Guide pins 86 are mounted on the pallet support platform 68 adjacent the curved end portion of the drive track whereby the guide grooves 82 formed in the underside of the pallets will be engaged by these pins, as the pallets are driven around the curved portion of the tracks, to maintain the proper parallel axis orientation of the pallets. Grooves 81 are a mirror image of grooves 82 and are provided so that the pallets are reversibly usable, i.e. with the portion thereof containing the grooves 81 functioning as the leading portion thereof. Guide walls 51 and 52, and guide pins 86 may, if desired, be made retractable to enable the stopping of the system and the rotation of a pallet located at a curved end portion thereof for convenience in the loading of articles thereon or the removal of articles therefrom. As seen in FIG. 8, the guide pin 86, which is mounted for up and down movement in a hole 140 in the platform 68, has an enlarged lower portion 142, and is encircled by a compression spring 144 which is retained betwen the platform 68 and the enlarged portion 142. A rocker arm 146 is mediately pivoted to a hanger 148 fixed to the underside of the platform 68. The right-most portion of the arm 146 bears upwardly against the enlarged portion 142, while the left-most portion is coupled by a toggle linkage assembly 150 to a hanger 152 fixed to the underside of the platform 68. When the toggle linkage is in its locked position, shown in FIG. 8, the arm 146 raises the pin 86 against the bias of the spring 142. When the toggle linkage is in its broken position, not shown, the spring 142 biases the pin 86 downwardly, out of engagement with the groove 82. As seen in FIG. 12, the guide wall 51 is pivotally mounted to a recess in the base member 53 by a hinge 154. A pin 156, similar to the pin 86, is mounted for up and down movement through a hole 158 in the member 53, and is controlled by a rocker arm, spring and toggle linkage assembly, not shown, but similar to that shown in FIG. 8. The pin 156, when in its elevated position, as shown in FIG. 12, abuts the guide wall 51 and holds the wall in its vertical position. When the pin 156 is lowered, the guide wall 51 is free to swing downwardly to a position flush with the base member 53.

FIG. 9 schematically depicts the application of the basic system of the invention to a 90° rather than 180° turn, whereby the adaptability of the system to extremely variable article flow path configurations is believed made clear. As should be noted, the only change required for the traverse of a 90°, rather than 180° turn, is a change in the configurations of the guide and drive tracks. FIG. 10 illustrates schematically at 120 only one of a practically limitless number of conveyor-storage system configurations made possible by combinations of generally straight track portions, the 180° curved track portions of FIG. 1 and the 90° curved track portion of FIG. 9.

FIG. 11 illustrates the use of the system for moving vertically disposed pallets. Since adjacent lines of pallets move in opposite directions, roller assemblies 86 may be provided therebetween to ride in pallet grooves 85 whereby a substantial portion of the weight of the pallets and the articles supported thereby will be absorbed by the roller assemblies rather than the drive pins. Any suitable article or material supporting means, for example but not limitatively, shelves as indicated at 100 may be secured to each pallet 71.

Simultaneous movement of a pallet in both the horizontal and vertical plane is made possible by the combined systems embodiment depicted in FIG. 12. As will be seen, the basic horizontal system, generally indicated at 110, is the same and may take the form of any of the embodiments disclosed hereinabove. In addition, however, at least one complete system, generally indicated at 110′, suitable for movement of the pallets included therein in a vertical plane, is mounted on one or more of the pallets movable in the horizontal plane by the horizontal system. The system 110′ will preferably, but not necessarily, take the form of the embodiment depicted in FIG. 1 wherein the links, and guide and drive tracks, extend the entire length of the system. For convenience of description, elements in the vertical system which correspond to elements in the horizontal system are designated by primed numerals. Any suitable driving means, as for example but not necessarily a reversible electric motor as indicated at 90, may be mounted upon platform 92 which is in turn mounted on vertical system base support member 53′. The motor 90 is utilized to actuate the non-illustrated drive means which drive the interconnected links around the drive and guide tracks of the vertical system. Power may be supplied to motor 90 in any convenient manner. For purposes of illustration, only, overhead trolley 91 is depicted as supplying power to motor contact element 93. In this embodiment of the invention, the pallets 71' will include horizontal platform 130 extending from the lower edge thereof as shown, whereby articles may be supported thereon. A vertically oriented guide wall 51' is included and functions in the manner of guide wall 51 of FIGS. 1 and 2 to prevent "canting" of the pallets as they traverse the curved track portions. In this embodiment, however, the function of guide walls 52 will be performed by motor mounting platform 92 and the pallet 71 upon which the vertical system is mounted, as should be obvious. A second vertical system, generally designated at 110" and only partially illustrated, may if desired be mounted on the opposite edge portion of the same pallet 71 of the horizontal system, with the opposite edges of the horizontal platforms 130 connected as shown to the pallets 71" of the said second system. Thus, will be provided increased support and driving force for the platforms 130 whereby relatively heavy loads, as for example but not necessarily, automobiles, may be more readily stored and conveyed thereon.

The modification of FIG. 12 is believed to clearly illustrate the versatility of applicant's system. For example, should it prove desirous to remove an article from a platform 130 known to be supported on the pallets designated for convenience of description as X' and X", which pallets are in turn included in the vertical conveyor-storage systems supported on horizontal pallet X, it becomes necessary only to activate the horizontal conveyor system until the pallet X is suitably located, whereupon activation of the vertical conveyor system mounted thereon to bring the platform 130 to a proper take-off position will enable convenient removal of the desired article. Alternatively, the activation of the horizontal and vertical systems may be performed simultaneously.

The practical applications of the invention in the material handling area are believed almost limitless and to extend to the storage and conveyance of any articles capable either as is, or in suitable containers, of being supported and moved.

While I have shown and described various preferred embodiments of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. In an apparatus for the materials handling of articles, a conveyor storage system comprising a first guide track, second and third guide tracks positioned respectively to either side thereof, each of said tracks being of generally closed-loop configuration and including interconnected generally curved and generally straight portions, a plurality of links positioned for movement relative to said guide tracks the ends of said links being pivotally connected and the axes of pivoting being parallel, said links including members extending therefrom into engagement with each of said tracks for guiding the movement of the links along the tracks in accordance with the configurations of the latter.

2. In an apparatus as in claim 1, wherein said links include first links pivotally interconnected at the member which engages the first track, and which extend therefrom to the second and third tracks, respectively, and second links extending between the second and third tracks and pivotally interconnected to said first links at the members which extend into engagement with the last-mentioned tracks.

3. In an apparatus as in claim 2, further including drive means cooperatively associated with said links for drivingly moving the links relative to the tracks.

4. In an apparatus as in claim 3, further including a support platform positioned on the side of the links remote from the tracks, said support platform having a slot formed therein of configuration conforming to at least the curved portions of the first track, and the member at which said first links are pivotally interconnected includes a portion which projects through the said slot for movement therewithin as the links are driven around the tracks.

5. In an apparatus as in claim 4, further including a plurality of article support means positioned on said support platform for movement relative thereto and including means engageable by said member which extends through the said slot whereby the article support means may be engaged thereby and drivingly moved relative to the support platform in a path conforming generally to the portion of the first track with which the said slot conforms.

6. In an apparatus as in claim 3, wherein the second and third tracks are generally parallel to the first track at the portions thereof of generally straight configurations, and alternately converge and diverge relative thereto as seen in the direction of link movement at the portions thereof of generally curved configurations, whereby a first member and an article support means engaged thereby will be alternately accelerated and decelerated relative to a second member and an article support means engaged thereby as the said article support means are drivingly moved in a path conforming to the configurations of the curved track portions, and whereby the said first and second article support means will move at the same velocity when drivingly moved by the said members in a path conforming to the configurations of the generally straight portions of the tracks.

7. In an apparatus as in claim 6, wherein the first track and said support platform are relatively positioned so that the said member at which the first links are pivotally interconnected will extend through the said support platform slot into driving engagement with the said article support means only in the vicinity of portions of the second and third tracks of curved configuration.

8. In an apparatus as in claim 5, wherein said support platform includes guide means positioned thereon adjacent the curved portions of the slot formed therein for engagement with the article support means as the latter are drivingly moved into contact therewith, whereby the orientation of the said support means may be controlled by the said engagement.

9. In an apparatus as in claim 8, wherein the said guide means comprise retractable portions whereby the orientation of the article support means may be changed by retracting the guide means when the former are positioned at the curved portions of the support platform slot.

10. In an apparatus as in claim 5, wherein the article support means comprise grooves formed in the surfaces thereof which face the surface of the support platform, and wherein the support platform includes guide pins positioned adjacent the curved portions of the slot formed therein and extending therefrom for engagement within the said grooves as the article support means are drivingly moved around the said slot portions, whereby the orientation of the latter may be controlled by the said engagement.

11. In an apparatus as in claim 5, wherein the support platform includes guide walls positioned adjacent the curved portions of the slot formed therein and extending therefrom for engagement with the article support means as the latter are drivingly moved around the said slot portions, whereby the orientation of the said support means may be controlled by the said engagement.

12. In an apparatus as in claim 6, further including at least a second conveyor-storage system of like-construction mounted substantially perpendicularly to the surface of the said support platform upon an article support means of the first-mentioned system, whereby the article support means of the second system may be moved simultaneously in two directions upon simultaneous actuation of the said first and second systems.

13. In an apparatus as in claim 6, wherein the support platform is positioned in a substantially horizontal plane and the apparatus further includes a second conveyor-storage system of like construction mounted substantially vertically upon an article support means of the first mentioned system, whereby the article support means of the said second system may be moved simultaneously in both the substantially horizontal and the substantially vertical directions by the simultaneous actuation of the said first and second systems.

14. In an apparatus as in claim 13, wherein a third conveyor-storage system of like construction, is also mounted substantially vertically upon the said article support means of the first-mentioned system, and wherein substantially horizontally extending article support elements extend between and are connected to an article support means of each of the said second and third systems, whereby the said article support elements may be moved simultaneously in both the substantially horizontal and substantially vertical directions by simultaneous actuation of the said first, second and third systems.

15. An apparatus for the handling of articles comprising: guide means including a first, a second and a third track positioned in a generally side-by-side manner; a plurality of sets of link means, each set including a first link means guided for movement along said first and said second tracks, a second link means guided for movement along said first and said third tracks, and a third link means guided for movement along said third and said second tracks, the ends of said first and said second link means being pivotally connected at their ends and the axes of pivoting being parallel, and the ends of said second and said third link means being pivotally connected at their ends and the axes of pivoting being parallel; a plurality of article support means, each support means being coupled to one of said sets of link means, respectively, for movement along said guide means with said respective set of link means connected at their ends and the axes of pivoting being parallel.

16. An apparatus for the handling of articles, comprising: guide means including a first track and second and third track positioned, respectively, on each side of said first track in a generally side-by-side manner; a plurality of sets of link means, each set including a first link means guided for movement along said first and said second tracks, a second link means guided for movement along said first and said third tracks, and a third link means guided for movement along said third and second tracks, the ends of said first and said second link means being pivotally connected at their ends and the axes of pivoting being parallel; and the ends of said second and said third link means being pivotally connected at their ends and the axes of pivoting being parallel; a plurality of article support means, each support means being coupled to one of said sets of link means, respectively, for movement along said guide means with said respective sets of link means connected at their ends and the axes of pivoting being parallel.

17. An apparatus for the handling of articles, comprising: guide means including a first track and second and third tracks positioned, respectively, on each side of said first track in a generally side-by-side manner; a plurality of sets of link means, each set including a first link means guided for movement along said first and said second tracks, a second link means guided for movement along said first and said second tracks, a second link means guided for movement along said first and said third tracks, and a third link means guided for movement along said third and said second tracks, the ends of said first and said second link means being pivotally connected at their ends and the axes of pivoting being parallel, and the ends of said second and said third link means being pivotally connected at their ends and the axes of pivoting being parallel; said sets of link means being disposed serially along said guide means, the ends of said third link means of a preceding set being pivotally interconnected with the ends of said first link means of the succeeding set and the axes of pivoting being parallel; and a plurality of article support means, each support means being coupled to one of said sets of link means, respectively, for movement along said guide means with said respective set; and means for moving said link means along their said respective tracks of said guide means.

18. An apparatus for the handling of articles, comprising: guide means including a first track and second and third tracks positioned, respectively, on each side of said first track in a generally side-by-side manner; a plurality of sets of link means, each set including a first link means guided for movement long said first and said second tracks, a second link means guided for movement along said first and said third tracks, and a third link means guided for movement along said third and said second tracks, the ends of said first and said second link means being pivotally connected at their ends and the axes of pivoting being parallel, and the ends of said second and said third link means being pivotally connected at their ends and the axes of pivoting being parallel; said sets of link means being disposed serially along said guide means the ends of, said third link means of a preceding set being pivotally interconnected with the ends of said first link means of the succeeding set and the axes of pivoting being parallel; a plurality of article support means, each support means being coupled to one of said sets of link means, respectively, for movement along said guide means with said respective set; and driving means coupled to said sets of link means for driving said sets along said guide means.

19. An apparatus for the handling of articles, comprising: guide means including a first track and second and third tracks positioned, respectively, on each side of said first track in a generally side-by-side manner; a plurality of sets of link means, each set including a first link means guided for movement along said first and said second tracks, a second link means guided for movement along said first and said third tracks, and a third link means guided for movement along said third and said second tracks, the ends of said first and second link means being pivotally connected at their ends and the axes of pivoting being parallel, and the ends of said second and said third link means being pivotally connected at their ends and the axes of pivoting being parallel; said sets of link means being disposed serially along said guide means the ends of, said third link means of a preceding set being pivotally interconnected with the ends of said first link means of the succeeding set and the axes of pivoting being parallel; a plurality of article support means, each support means being coupled to one of said sets of link means, respectively, for movement along said guide means with said respective set; driving means coupled to said sets of link means for driving said sets along said guide means; said tracks being of generally closed loop configurations, and said sets of links being pivotally interconnected in endless chain fashion to form a system of sets of links which conforms generally to the closed loop configuration of said guide means.

20. An apparatus according to claim 19, wherein the track configurations include curved portions of approximately 90° change in direction.

21. An apparatus according to claim 19, wherein the track configuration include curved portions of approximately 180° change in direction.

22. An apparatus according to claim 19, wherein the track configurations include curved portions or approximately 90° change in direction and curved portions of approximately 180° change in direction.

11

23. An apparatus according to claim 18, wherein said tracks comprise members with slots formed therein and said link means include portions extending into said slots.

24. An apparatus according to claim 19, wherein one of said link means of each of said sets of link means includes a drive pin, and said driving means includes a rotatable arm with a slot formed therein for engaging said pin and driving said one of said link means along said guide means as said arm is rotated.

25. An apparatus for the handling of articles, comprising: guide means including a first track and second and third tracks positioned respectively on each side of said first track in a generally side-by-side manner; a plurality of sets of link and follower means, each set including a first track follower means, two second track follower means, a third track follower means, a first link means pivotally connected at its opposite ends to said first track follower means, respectively, all of the axes of pivoting being parallel and one of said second track follower means, a second link means pivotally connected at its opposite ends to said first track follower means and said third track follower means, respectively, all of the axes of pivoting being parallel, and a third link means pivotally connected at its opposite ends to said third track follower means and the other of said second track follower means, respectively, all of the axes of pivoting being parallel; and driving means coupled to said sets of link means for driving said sets along said guide means.

26. An apparatus for the handling of articles, comprising: guide means including a first track and second and third tracks positioned respectively on each side of said first track in a generally side-by-side manner; a plurality of sets of link and follower means, each set including a first track follower means, two second track follower means a third track follower means, a first link means pivotally connected at its opposite ends to said first track follower means and one of said second track follower means, respectively, all of the axes of pivoting being parallel, a second link means pivotally connected at its opposite ends to said first track follower means and said third track follower means, respectively, all of the axes of pivoting being parallel, and a third link means pivotally connected at its opposite ends to said third track follower means and the other of said second track follower means, respectively, all of the axes of pivoting being parallel, said sets of link and follower means being disposed serially along said guide means, said one of said second track follower means of a succeeding set being identical with said other of said second track follower means of the preceding set; and driving means coupled to said sets of link means for driving said sets along said guide means.

27. An apparatus for the handling of articles, comprising: guide means including a first track and second and third tracks positioned respectively on each side of said first track in a generally side-by-side manner; a plurality of sets of link and follower means, each set including a first track follower means, two second track follower means, a third track follower means, a first link means pivotally connected at its opposite ends to said first track follower means and one of said second track follower means, respectively, all of the axes of pivoting being parallel, a second link means pivotally connected at its opposite ends to said first track follower means and said third track follower means, respectively, all of the axes of pivoting being parallel, and a third link means pivotally connected at its opposite ends to said third track follower means and the other of said second track follower means, respectively, all of the axes of pivoting being parallel, said sets of link and follower means being disposed serially along said guide means, said one of said second track follower means of a succeeding set being identical with said other of said second track follower means of the preceding set, and a plurality of article support means, each support means being coupled to one of said sets, respectively, for movement along said guide means with said respective set; and driving means coupled to said sets of link means for driving said sets along said guide means.

28. An apparatus for the handling of articles, comprising: guide means including a first track and second and third tracks positioned respectively on each side of said first track in a generally side-by-side manner; a plurality of sets of link and follower means, each set including a first track follower means, two second track follower means, a third track follower means, a first link means pivotally connected at its opposite ends to said first track follower means and one of said second track follower means respectively, all of the axes of pivoting being parallel, a second link means pivotally connected at its opposite ends to said first track follower means and said third track follower means, respectively, all of the axes of pivoting being parallel, and a third link means pivotally connected at its opposite ends to said third track follower means and the other of said second track follower means, respectively, all of the axes of pivoting being parallel, said sets of link and follower means being disposed serially along said guide means, said one of said second track follower means of a succeeding set being identical with said other of said second track follower means of the preceding set; a plurality of article support means, each support means being coupled to said first track follower means of each set, respectively, for movement along said first track with said first track follower means; and driving means coupled to said sets of link means for driving said sets along said guide means.

29. An apparatus for the handling of articles, comprising: guide means including a first track and second and third tracks positioned respectively on each side of said first track in a generally side-by-side manner; a plurality of sets of link and follower means, each set including a first track follower means, two second track follower means, a third track follower means, a first link means pivotally connected at its opposite ends to said first track follower means and one of said second track follower means, respectively, all of the axes of pivoting being parallel, a second link means pivotally connected at its opposite ends to said first track follower means and said third track follower means, respectively, all of the axes of pivoting being parallel, and a third link means pivotally connected at its opposite ends to said third track follower means and the other of said second track follower means, respectively, all of the axes of pivoting being parallel, and said sets of link and follower means being being disposed serially along said guide means, said one of said second track follower means of a succeeding set being identical with said other of said second track follower means of the preceding set, a plurality of article support means, each support means being coupled to said first track follower means of each set, respectively, for movement along said first track with said first track follower means, and a driving means having means for serially engaging each first track follower means for serially moving said sets along said guide means.

30. An apparatus for the handling of articles, comprising: guide means including a first track and second and third tracks positioned respectively on each side of said first track in a generally side-by-side manner; a plurality of sets of link and follower means, each set including a first track follower means, two second track follower means, a third track follower means, a first link means pivotally connected at its opposite ends to said first track follower means and one of said second track follower means, respectively, all of the axes of pivoting being parallel, a second link means pivotally connected at its opposite ends to said first track follower means and said third track follower means, respectively, all of the axes of pivoting being parallel, a third link means pivotally connected at its opposite ends to said third track follower means and the other of said second track follower means, respectively, all of the axes of pivoting being parallel, said sets of link and follower means being disposed serially along said guide means, said one of said second track follower means of a succeeding set being identical with said other of said second track follower means of the preceding set, wherein said second and said third tracks are generally parallel to said first track at portions thereof of generally straight configuration, and alternately converge and diverge in the direction of movement of said sets, toward and away from said first track at portions thereof of generally curved configuration, whereby said first track follower means of a preceding set will be alternately accelerated and decelerated relative to said first track follower means of the succeeding set as the preceding set moves along a generally curved configuration of said guide means; and driving means coupled to said sets of link means for driving said sets along said guide means.

References Cited by the Examiner

UNITED STATES PATENTS

| | | | |
|---|---|---|---|
| 1,313,091 | 8/1919 | Lamar | 104—20 |
| 1,380,988 | 6/1921 | Lloyd | 104—25 |
| 1,412,896 | 4/1922 | Sachs | 104—25 |
| 1,846,632 | 2/1932 | De Kay | 186—1 |
| 2,773,609 | 12/1956 | Holappa | 214—16.1 |

MILTON BUCHLER, *Primary Examiner.*

LEO QUACKENBUSH, EUGENE G. BOTZ, *Examiners.*